(12) United States Patent
Cabrera et al.

(10) Patent No.: US 7,623,833 B2
(45) Date of Patent: Nov. 24, 2009

(54) DUAL OUTPUT DIGITAL EXCITER

(75) Inventors: George Cabrera, Mason, OH (US); Timothy Wilfred Dittmer, Mason, OH (US); Wayne Douglas-Duello, Hamilton, OH (US)

(73) Assignee: Harris Corporation, Melbourne, FL (US)

( * ) Notice: Subject to any disclaimer, the term of this patent is extended or adjusted under 35 U.S.C. 154(b) by 374 days.

(21) Appl. No.: 11/403,304

(22) Filed: Apr. 13, 2006

(65) Prior Publication Data

US 2007/0243836 A1    Oct. 18, 2007

(51) Int. Cl.
*H04B 1/04* (2006.01)

(52) U.S. Cl. ............................ 455/91; 455/93; 455/103; 455/118

(58) Field of Classification Search ................... 455/91, 455/102–105, 108–113, 118–119, 127.4, 455/552.1–553.1, 93; 375/268–272, 295, 375/300–303
See application file for complete search history.

(56) References Cited

U.S. PATENT DOCUMENTS

| | | | | |
|---|---|---|---|---|
| 5,315,583 | A * | 5/1994 | Murphy et al. | 370/312 |
| 5,588,022 | A * | 12/1996 | Dapper et al. | 375/216 |
| 5,956,624 | A * | 9/1999 | Hunsinger et al. | 455/65 |
| 6,016,080 | A * | 1/2000 | Zuta et al. | 331/25 |
| 6,067,445 | A | 5/2000 | Gray et al. | |
| 6,144,705 | A | 11/2000 | Papadopoulos et al. | |
| 6,351,500 | B2 * | 2/2002 | Kumar | 375/270 |
| 6,381,265 | B1 * | 4/2002 | Hessel et al. | 375/219 |
| 6,452,977 | B1 | 9/2002 | Goldston et al. | |
| 6,510,175 | B1 | 1/2003 | Hunsinger et al. | |
| 6,611,568 | B2 * | 8/2003 | Hawley et al. | 375/308 |
| 6,813,907 | B2 | 11/2004 | Dawes et al. | |
| 6,845,083 | B2 * | 1/2005 | Mollenkopf et al. | 370/215 |
| 7,088,740 | B1 * | 8/2006 | Schmidt | 370/490 |
| 7,110,727 | B2 * | 9/2006 | Dekker | 455/91 |
| 7,272,363 | B1 * | 9/2007 | Fluker | 455/91 |
| 2005/0190851 | A1 | 9/2005 | Cabrera | |
| 2005/0215206 | A1 * | 9/2005 | Granstrom et al. | 455/102 |
| 2006/0017521 | A1 | 1/2006 | Downs | |

OTHER PUBLICATIONS

"Improving Efficiency With Split-Level Combining", by George Cabrera (written in 2004 and available at http://www.harris.com).
International Search Report PCT/US07/08523; published Aug. 14, 2008.

* cited by examiner

*Primary Examiner*—Simon D Nguyen
(74) *Attorney, Agent, or Firm*—Tarolli, Sundheim, Covell & Tummino LLP

(57) ABSTRACT

Systems and methods are provided for generating dual outputs in a digital exciter system. A first signal path produces one of a frequency modulated audio signal, a digital information signal, and a signal comprising both frequency modulated audio and digital information. A second signal path produces one of a frequency modulated audio signal, a digital information signal, and a signal comprising both frequency modulated audio and digital information. A main exciter output provides one of the signal produced at the first signal path and the signal produced at the second signal path to an associated first signal destination. An auxiliary exciter output provides one of the signal produced at the first signal path and the signal produced at the auxiliary signal path to an associated second signal destination.

5 Claims, 4 Drawing Sheets

DUAL OUTPUT DIGITAL EXCITER

BACKGROUND OF THE INVENTION

1. Field of the Invention

This invention relates to the field of signal generation in a communication system, and, more particularly, to the production of multiple output signals in a single digital exciter assembly.

2. Description of the Prior Art

It has been known in the radio broadcasting art to transmit a composite signal consisting of a frequency modulated (FM) analog signal and a digital signal, such as an in band on channel (IBOC) digital signal. The prior art includes, for example, the U.S. patents to Murphy et al. U.S. Pat. No. 5,315,583 and Papadopoulos et al. U.S. Pat. No. 6,144,705.

The prior art also includes separate generation and amplification of such signals, sometimes referred to as high-level combining. An example is illustrated in FIG. 1 herein. In this example, the output $v_2$ of an existing first transmitter 10, illustrated as a main transmitter, is combined with the output $v_3$ from a second transmitter 12, referred to as an auxiliary transmitter. The input to the main transmitter 10 is obtained from a first signal source 14 while the input to the auxiliary transmitter 12 is obtained from a second signal source 16. The outputs $v_2$ and $v_3$ of these transmitters are combined in a conventional coupler C, which typically is a 10 dB coupler. The coupler, which is sometimes known as an output coupler, provides an output $v_1$ that is supplied to a transmitting antenna 20 for broadcasting the composite signal. The coupler C has ports 1, 2, 3, and 4 with the voltages $v_2$ and $v_3$ being applied to ports 2 and 3. The output at port 1 is supplied to the antenna 18. Port 4 is coupled to a reject load RL.

SUMMARY OF THE INVENTION

In accordance with one aspect of the present invention, a dual output digital exciter system is provided. A first signal path produces one of a frequency modulated audio signal, a digital information signal, and a signal comprising both frequency modulated audio and digital information. A second signal path produces one of a frequency modulated audio signal, a digital information signal, and a signal comprising both frequency modulated audio and digital information. A main exciter output provides one of the signal produced at the first signal path and the signal produced at the second signal path to an associated first signal destination. An auxiliary exciter output provides one of the signal produced at the first signal path and the signal produced at the auxiliary signal path to an associated second signal destination.

In accordance with another aspect of the present invention, a digital exciter apparatus is provided. A first digital modulator, having an associated first local oscillator, produces a first digital radio frequency (RF) signal. A second digital modulator, having an associated second local oscillator, produces a second digital RF signal. A digital phase detection component maintains a substantially constant phase offset between an output of the first local oscillator and an output of the second local oscillator, such that a relative phase between the first digital RF signal and the second digital RF signal is maintained at a desired phase offset.

In accordance with yet another aspect of the present invention, a method is provided for producing a composite signal for transmission. A first digital radio frequency (RF) signal is generated. A second digital RF signal, having an associated phase relative to the first digital RF signal is generated. The first digital RF signal is synchronized with the second digital RF signal in the digital domain, such that the relative phase between the first digital RF signal and the second digital RF signal is substantially equal to a desired phase offset value. The first and second digital RF signals are converted to respective first and second analog RF signals. The first and second analog RF signals are combined to produce the composite signal.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

There are a number of applications in which it is desirable to have two outputs provided to a given transmission system. For example, in digital radio, an audio signal and a signal containing digital information can be combined to provide a composite signal for broadcast. In other systems, a second signal is utilized as a redundant back-up or simply to provide a secondary signal type for a given application.

In the past, it has been necessary to provide the two signals to be combined from two separate signal sources. The use of separate signal sources leads to a loss of flexibility, as each exciter is configured to produce an associated signal type, and a change in the system output, where possible, generally requires adjustment of both exciters. In addition, it is difficult to properly synchronize the two signals prior to combining. Presently, the phase between the two signals can be controlled by manually adjusting the length of the transmission lines for the signals. It will be appreciated that such manual adjustment is time-consuming and less than precise, potentially resulting in distortion within the combined signal.

The present invention provides a dual output digital exciter is utilized to generate the two signals to be combined. A relative phase between the two output signals of the exciter can be maintained by a digital phase detector within the exciter, eliminating the need for manual phase adjustment between the signals in the analog domain. Additionally, a multiplexer within the dual output exciter allows for the output along a given output path of the exciter to be reconfigured to provide a signal from a first output path to a second path when desired. The improved system provides various benefits including higher overall system efficiency, increased flexibility, and superior phase alignment between the combined signals.

Figure 2:
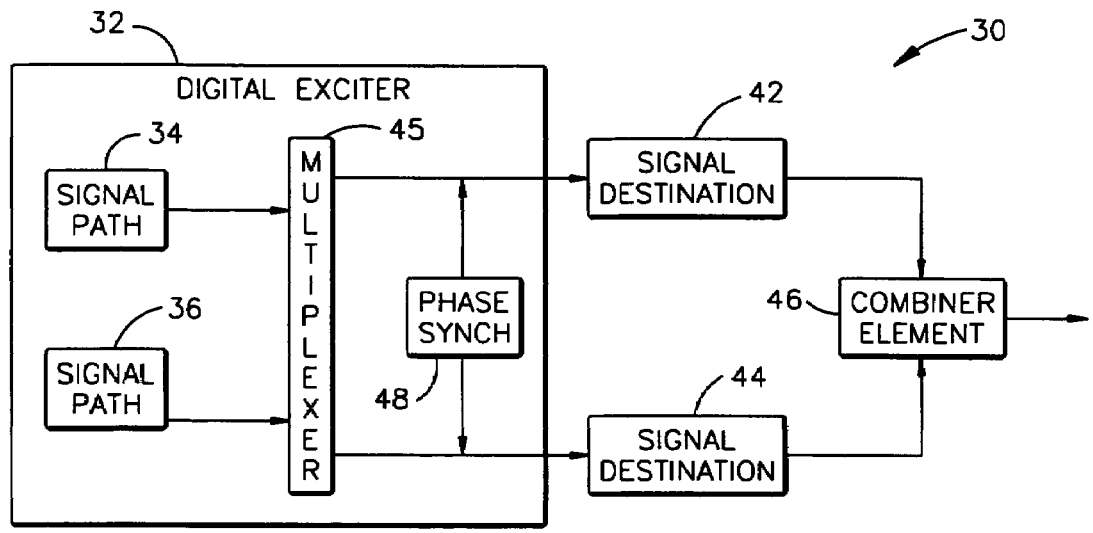
FIG. 2 illustrates a radio frequency (RF) transmission system in accordance with an aspect of the present invention.

FIG. 2 illustrates a radio frequency (RF) transmission system 30 in accordance with an aspect of the present invention.

The RF transmission system 30 comprises a digital exciter 32 operative to produce respective main and auxiliary outputs. The digital exciter 32 comprises a first signal path 34, comprising a plurality of digital signal processing components, that produces a first digital RF signal, and a second signal path 36, comprising a plurality of digital signal processing components, that produces a second digital RF signal.

In one implementation of the present invention, each of the first signal path 34 and the second signal path 36 can each produce one of an FM audio signal, a digital information signal, and a signal comprising both FM audio and a digital information. It will be appreciated that the two signal paths 34 and 36 can be of different types. For example, in one implementation of a high definition (HD) radio exciter, the first signal path 34 can produce an FM audio signal, and the second signal path 36 can produce a digital information signal, such that the digital information signal can be applied to the FM radio signal as an in-band, on-channel (IBOC) signal.

The output of the first signal path 34 is provided to a first signal destination 42, and the output of the second signal path 36 is provided to a second signal destination. For example, the first signal destination 42 and the second signal destination 44 can comprise respective main and auxiliary cabinets of a radio frequency transmitter, respective first and second radio frequency transmitters, or any other appropriate destinations for the signal.

In an exemplary implementation, each of the first signal destination 42 and the second signal destination 44 can comprise an amplifier and various precorrection or filtering components associated with the amplifier for amplifying their respective input signals prior to transmission. For example, in one implementation of an HD exciter, the first signal destination 42 can comprise a nonlinear amplifier for amplifying a constant envelope provided at the main output and the second signal destination 44 can comprise a linear amplifier that amplifies a signal having at least some amplitude modulation provided at the auxiliary output.

In accordance with one aspect of the present invention, the first signal path 34 and the second signal path 36 can be provided to a digital multiplexer 45 that allows the signal provided to each of the first and second signal destinations 42 and 44 to be independently selected. The multiplexer 45 can be dynamically reconfigured, such that the signal provided to a given signal destination 42 and 44 is changed during the operation of the exciter 32. For example, the digital multiplexer 45 can be initially configured to pass the output of a first signal path 34 to the first signal destination 42 and the output of the second signal path to the second signal destination 44. Upon a failure of the first signal path 42, the multiplexer 45 can be reconfigured such that the output of the second signal path is provided to both signal destinations 42 and 44.

The outputs of the first signal destination 42 and the second signal destination 44 are provided to a combining element 46 that generates a combined signal for transmission. For example, the combining element 46 can include a high-power, radio frequency (RF) multiplexer. To facilitate the combination of the signals, the outputs selected by the multiplexer 45 can be maintained at a constant phase offset by a digital phase synchronization component 48 within the exciter 32. The digital phase synchronization component 48 maintains a relative phase between respective digital modulation signals associated with the signal provided to the first signal destination 42 and the signal provided to the second signal destination 44 to ensure that a desired phase offset is maintained between the two signals. For example, the desired phase offset can be zero, such that the signals are synchronized in phase. The combined signal can then be transmitted across a desired medium.

Figure 3:
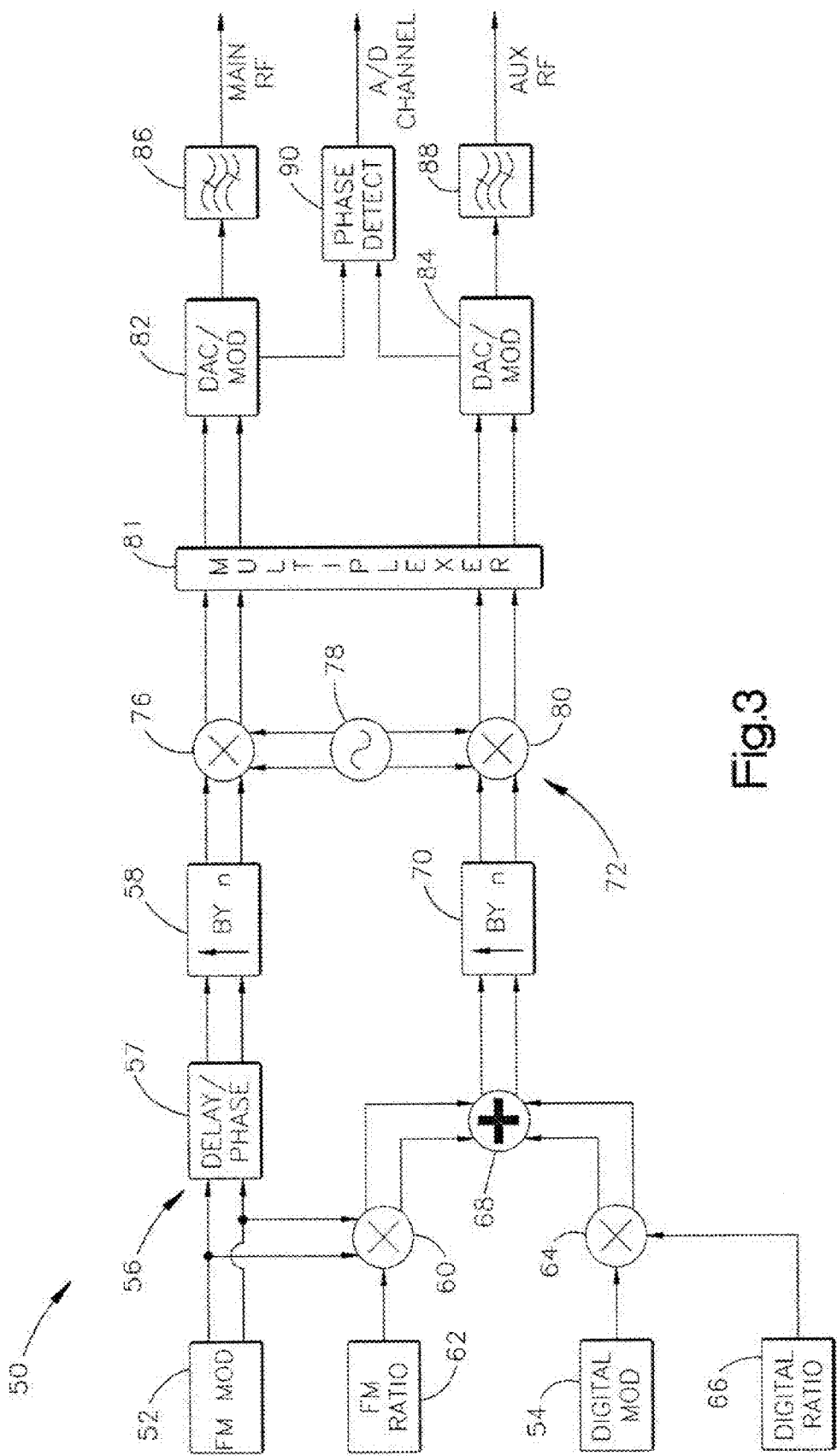
FIG. 3 illustrates an exemplary exciter apparatus in accordance with an aspect of the present invention.

FIG. 3 illustrates an exemplary exciter apparatus 50 in accordance with an aspect of the present invention. The illustrated apparatus 50 comprises a frequency modulated (FM) digital audio source 52 and a digital information signal source 54. In the illustrated example, the frequency modulated audio source 52 comprises the beginning of a first signal path 56. The output of the frequency modulated (FM) audio source 54 is provided to a delay element 57 that provides a desired delay and phase shift in the FM output, for example, to account for differences in transmission lines associated with the two outputs of the exciter apparatus 50. It will be appreciated that the delay element 57 can include a phase shifter such that the applied delay can include both full cycles and fractions of a cycle. The delayed signal is then provided to a first interpolation component 58 along the first signal path 56.

The output of the frequency modulated audio source 52 is also provided to a first complex multiplier 60, where it is weighted by an FM ratio 62. The output of the information signal source 54 is provided to a second complex multiplier 64 where it is weighted by a digital ratio 66. The weighted outputs of the first and second complex multipliers 60 and 64 are provided to a complex summer 68. The combined signal from the complex summer 68 is provided to a second interpolator element 70 as the beginning of a second signal path 72.

The first and second interpolator elements 58 and 70 each raise the sampling rate of their respective input signal by a factor of n via interpolation between adjacent sample points, where the values of n depends on a specific application. The output of the first interpolator element 58 is provided to a third complex multiplier 76, where it is mixed with a carrier from a first local oscillator 78 to upconvert the signal to an intermediate frequency (IF). The output of the second interpolator element 70 is provided to a fourth complex multiplier 80, where it is mixed with the carrier from the first local oscillator 78 to upconvert the signal to the intermediate frequency.

The IF signal from the first signal path and the IF signal from the second signal path are provided a multiplexer 81. The multiplexer 81 selects one of the two IF signals to provide to each of a main output and an auxiliary output of the exciter apparatus 50. The signals are selected independently of one another, such that both exciter outputs can receive the same IF signal (e.g., the FM audio main path signal) or each IF signal can be provided to one of the exciter outputs. It will be appreciated that this allows the signal provided to a given exciter output to be easily changed simply by changing a control input to the multiplexer 81, providing a significant increase in flexibility to the exciter apparatus.

The selected first output of the multiplexer 81 is provided to a first modulation/conversion module 82. The first modulation/conversion module 82 upconverts the provided IF signal to a digital RF signal, using an associated second local oscillator (not shown), and then converts the digital RF signal into a first analog RF signal associated with a main output of the exciter apparatus 50. The selected second output of the multiplexer 81 is provided to a second modulation/conversion module 84. The second modulation/conversion module 84 upconverts the provided IF signal to a digital RF signal, using an associated third local oscillator (not shown) having an associated frequency equal to the associated frequency of the second local oscillator, and then converts the digital RF signal into a second analog RF signal associated with an auxiliary output of the exciter apparatus 50. The first and second analog RF signals are filtered at respective first and second bandpass filters 86 and 88. The output of the first bandpass filter 86 provides the main output for the exciter apparatus 50, and the output of the second bandpass filter 88 provides the auxiliary output for the exciter apparatus.

In accordance with an aspect of the present invention, a phase offset can be maintained between the main and auxiliary outputs of the exciter by a phase detection component 90. In one implementation, the phase detection component determines a relative phase between the second and third local oscillators and determines if the relative phase between the signals is equal to a desired phase offset. If it is determined that relative phase between the signals is not equal to the desired phase offset, all or a portion of the exciter can be reset to bring the signals back into phase. For example, one or both of the second and third local oscillators can be reset.

Figure 1:
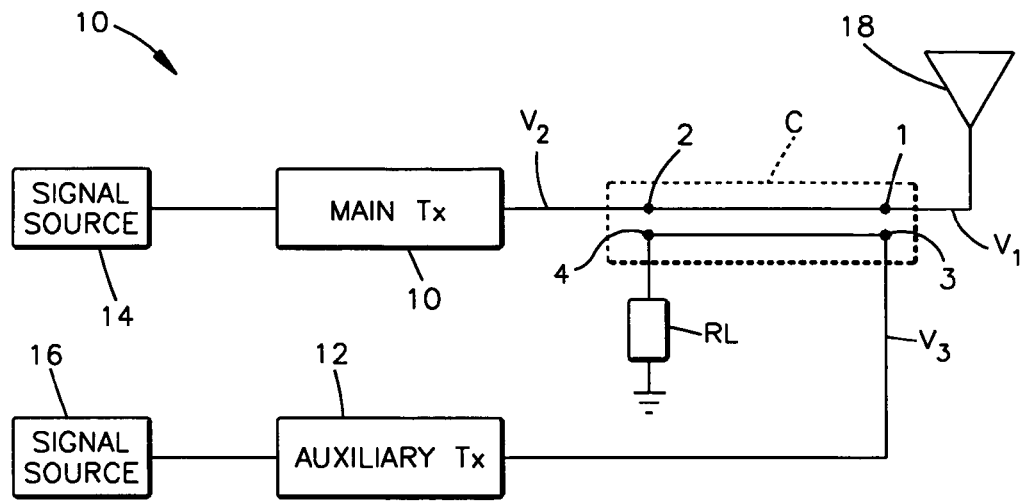
FIG. 1 illustrates a block diagram illustration of a prior art transmission system.
Figure 4:
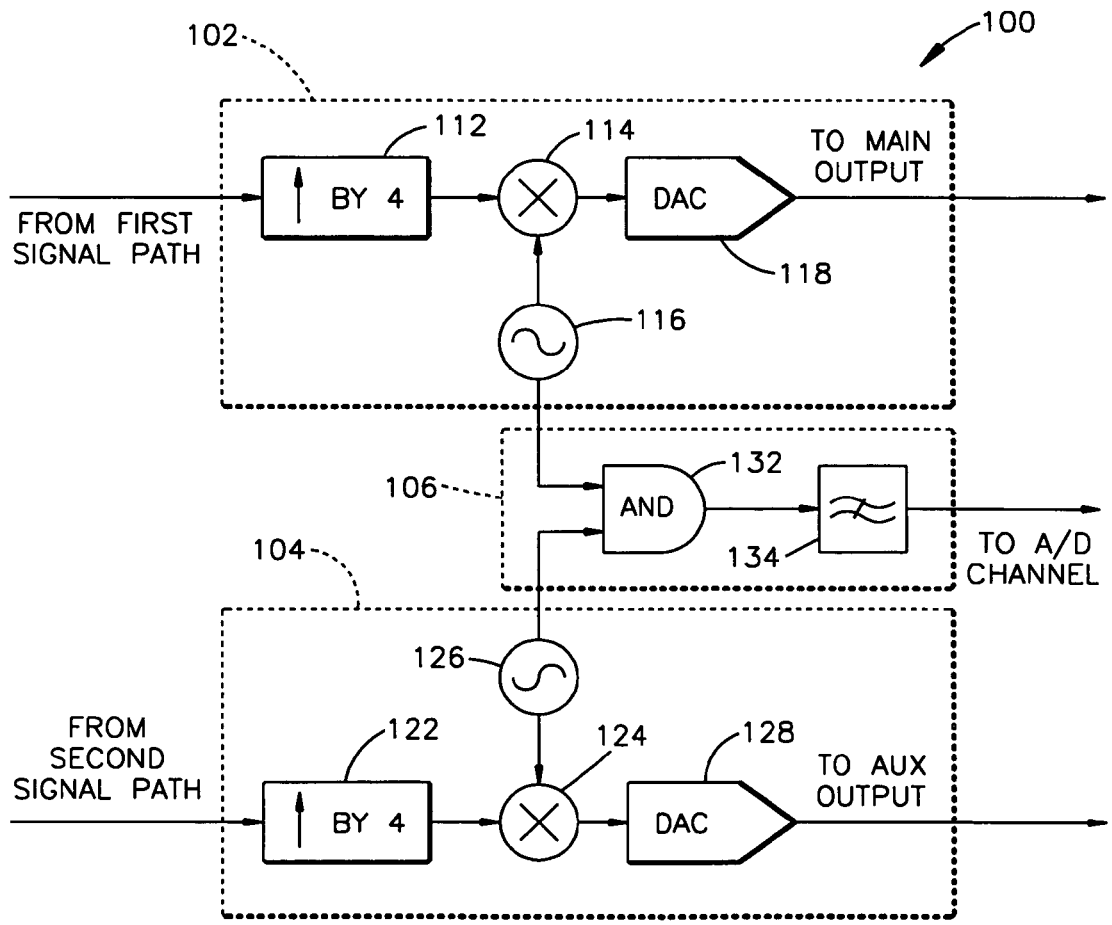
FIG. 4 illustrates an exemplary implementation of modulation/conversion components of an exciter in accordance with an aspect of the present invention and an associated phase detection component.

FIG. 4 illustrates an exemplary implementation 100 of the modulation/conversion components 102 and 104 of an exciter in accordance with an aspect of the present invention and an associated phase detection component 106. Within a first modulation/conversion component 102, a first intermediate frequency (IF) digital signal, associated with a main output of the exciter, is provided to a first interpolator element 112 that increases the sample rate of the intermediate frequency signal by a factor of four. The output of the first interpolator element 112 is provided to a first digital multiplier 114 that combines the first IF signal with a radio frequency (RF) carrier from a first local oscillator 116. The resulting RF digital signal is then converted to a first analog RF signal at a first digital-to-analog converter (DAC) 118, and the first analog RF signal is provided to the main output of the exciter.

Within a second modulation/conversion component 104, a second intermediate frequency (IF) digital signal, associated with an auxiliary output of the exciter, is provided to a second interpolator element 122 that increases the sample rate of the intermediate frequency signal by a factor of four. The output of the second interpolator element 122 is provided to a first digital multiplier 124 that combines the second IF signal with a radio frequency (RF) carrier from a second local oscillator 126. It will be appreciated that the carrier produced at the second local oscillator 126 can have a frequency equal to that of the carrier produced at the first local oscillator 116. The resulting RF digital signal is then converted to a second analog RF signal at a second DAC 128, and the second analog RF signal is provided to an auxiliary output of the exciter.

In accordance with an aspect of the present invention, a desired phase offset is maintained between the outputs of the first and second modulation/conversion components 102 and 104 by a phase detection component 106. To this end, the outputs of the first and second local oscillators are also provided as two inputs to a logical AND gate 132. The output of the AND gate is then filtered at a low pass filter 134. A relative phase can be determined from the filtered output of the logical AND gate 132 by measuring the amplitude of the filtered output. When the determined relative phase is not substantially equal to a desired phase offset, one or both of the first and second local oscillators 116 and 124 can be reinitialized to a default value to restore the desired phase offset of the first and second analog RF signals.

Figure 5:
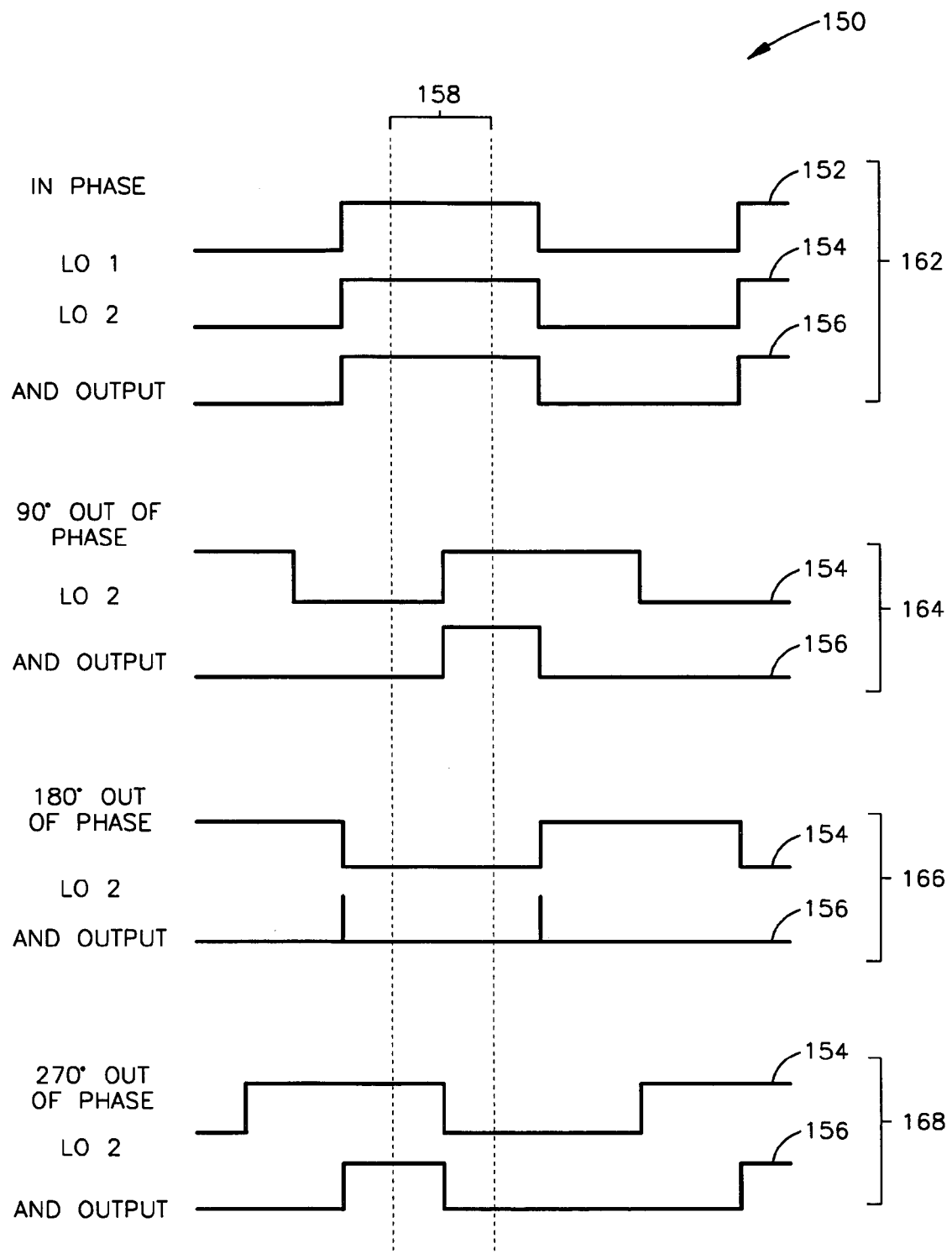
FIG. 5 illustrates a diagram of the output of a logical AND gate given several exemplary sets of inputs.

The phase detection performed by the phase detector 106 of FIG. 4 can best be explained with reference to FIG. 5. FIG. 5 illustrates a diagram 150 of the output of a logical AND gate when a second input to the logical AND gate is either in phase, ninety degrees out of phase, one hundred eighty degrees out of phase, and two hundred seventy degrees out of phase relative to a first input to the logical AND gate.

In the diagram 150, an exemplary first input 152 to the AND gate can represent a first local oscillator associated with a main exciter output. An exemplary second input 154 to the AND gate can represent a second local oscillator associated with an auxiliary exciter output. For given first and second inputs 152 and 154, an AND gate output 156 can be determined. A region of interest 158 coinciding with the center of a voltage high region of the first input 152 will vary according to the relative phase of the first and second inputs 152 and 154, providing an indication of a phase difference between the oscillators represented by the inputs.

In a first example 162, the second input 154 is in phase with the first input 152. It will be appreciated that with the two inputs 152 and 154 in phase, an associated AND gate output 156 will assume a high voltage state when the two inputs are in a high voltage state, and a low voltage state when the two inputs are in a low voltage state. Accordingly, the output 156 of the AND gate remains in a high voltage state through the region of interest 158. In a second example 164, the second input 154 is ninety degrees out of phase with the first input 152. Accordingly, the second input 154 does not reach a high voltage state until halfway through a voltage high period of the first input 152. The AND gate output 156 will remain at a low voltage state through a first half of the region of interest 158, and assume a high voltage state at the halfway point, when the second input reaches a high voltage state.

In a third example 166, the second input 154 is one hundred and eighty degrees out of phase with the first input 152. Since the two signals are opposite in phase, the AND gate output 156 will remain in a low voltage state for substantially all of a given oscillator cycle. Accordingly, the output 156 of the AND gate remains in a low voltage state through the region of interest 158. In a fourth example 168, the second input 154 is two hundred and seventy degrees out of phase with the first input 152. Accordingly, the second input 154 assumes a high voltage state one-quarter of a cycle before the first input 152, and thus assumes a low voltage state halfway through a voltage high period of the first input 152. The AND gate output 156 will begin at a high voltage state, but assume a low voltage state for the second half of the region of interest 158.

As will be appreciated from the above, the relative phase of the oscillators can be quickly and efficiently determined according to output 156 of the AND gate. For example, the output 156 of the AND gate can be low pass filtered, and the amplitude of the filter output can be measured. From the measured amplitude, an approximate phase difference between the inputs 152 and 154 could be determined. It will be appreciated that other digital means can be utilized to determine the relative phase between the two oscillator signals, such as a state machine implemented as part of a field programmable gate array, an analysis of oversampled signal derived from the two oscillator signals, or other, similar means.

Figure 6:
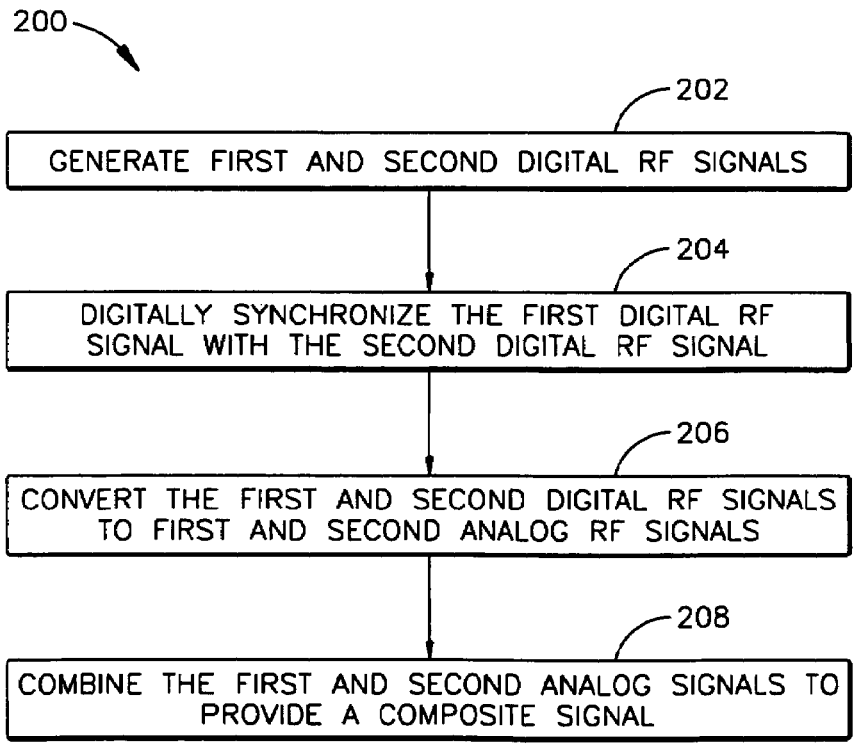
FIG. 6 illustrates a methodology for producing a composite signal for transmission in accordance with an aspect of the present invention.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 6 illustrates a methodology 200 for producing a composite signal for transmission in accordance with an aspect of the present invention. At step 202, first and second digital radio frequency (RF) signals are generated. For example, an intermediate frequency (IF) signal associated with a first path of a digital exciter can be mixed (e.g., digitally multiplied) with a carrier signal from a local oscillator associated with the main exciter output to produce the first digital RF signal. Similarly, an intermediate frequency (IF) signal associated with a second signal path of a digital exciter can be mixed with a carrier signal from a local oscillator associated with the auxiliary exciter output to produce the second digital RF signal. It will be appreciated that each of the first and second digital RF signals can have an associated phase difference, which is a function of the difference in phase between the carriers provided by their respective local oscillators.

At step 204, the first digital RF signal is synchronized with the second digital RF signal in the digital domain, such that the relative phase between the first digital RF signal and the second digital RF signal is substantially equal to a desired phase offset value. For example, it can be determined if a relative phase between the first carrier signal and the second carrier signal is equal to the desired phase offset. If not, one or both of the first local oscillator and the second local oscillator can be reset until the desired phase is achieved.

At step 206, the first and second digital RF signals are converted to respective first and second analog RF signals. It will be appreciated that this conversion occurs after the synchronization of the signals has been achieved, such that no synchronization of the signal in the analog domain is necessary. At step 208, the first and second analog RF signals are combined to form the composite signal. For example, the combination can be achieved via a high power RF multiplexer. In an exemplary implementation, the first and second analog RF signals can be amplified prior to their combination into the composite signal.

In one implementation of the described methodology, the first digital RF signal can comprise a frequency modulated (FM) audio signal, and the second digital RF signal can comprise digital information in the form of an in-band, on channel (IBOC) signal. In this implementation, the first digital RF signal can be amplified by a nonlinear amplifier, while the second digital RF signal is amplified at a linear amplifier to preserve the amplitude modulation represented by the IBOC signal. When the amplified signals are combined, the composite signal comprises an FM HD radio signal with digital information carried within the FM audio channel.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, the following is claimed:

1. A digital exciter apparatus for a radio system comprising:
   a first digital modulator, having an associated first sampling rate, that is configured to produce a first digital signal representing an analog frequency modulated (FM) signal;
   a second digital modulator, having an associated second sampling rate, that is configured to produce a second digital signal representing an information signal suitable for application to the analog FM signal in an in-band, on-channel (IBOC) arrangement;
   a first digital-to-analog converter that receives one of the first digital signal, the second digital signal, and a third digital signal representing a combination of the first digital signal and the second digital signal in a specified ratio and provides one of the analog FM signal, the information signal, and the combination of the analog FM signal and the information signal to a first output of the exciter apparatus; and
   a second digital-to-analog converter that receives one of the first digital signal, the second digital signal, and the third digital signal and provides one of the analog FM signal, the information signal, and a combination of the analog FM signal and the information signal to a second output of the exciter apparatus.

2. The digital exciter apparatus of claim 1, further comprising a digital phase adjustment component configured to delay at least one of the first digital signal, the second digital signal, and the third digital signal as maintain a specified phase offset between an output of the first digital-to-analog converter and an output of the second digital-to-analog converter.

3. The apparatus of claim 1, further comprising a digital multiplexer that selects one of the first digital signal, the second digital signal, and the third digital signal to be provided to each of the first digital-to-analog converter and the second digital-to-analog converter.

4. A method for producing a radio signal for transmission comprising:
   generating a first digital signal representing an analog frequency modulated (FM) signal;
   generating a second digital signal representing an information signal configured to be applied to the analog signal in an in-band, on-channel (IBOC) arrangement, having an associated phase relative to the first digital signal;
   synchronizing the first digital signal with the second digital signal in a digital domain, such that a relative phase between the analog frequency modulated (FM) signal and the information signal is substantially equal to a specified phase offset value;
   converting the first and second digital signals into an analog domain at respective first and second digital-to-analog converters to provide the analog FM signal and the information signal; and
   combining the first analog signal and the information signal to provide the signal for transmission.

5. The method of claim 4, further comprising combining the first and second digital signals to produce a composite signal, wherein converting the first and second digital signals into the analog domain comprises converting the composite signal into the analog domain.

* * * * *